May 30, 1967 — T. L. MYLES — 3,321,911
GAS TURBINE ENGINE WITH ROTATING COMBUSTION CHAMBER
Filed Feb. 12, 1965 — 5 Sheets-Sheet 1

INVENTOR
Tommie Lynn Myles
BY Adolph C. Hugin
ATTORNEY

May 30, 1967     T. L. MYLES     3,321,911
GAS TURBINE ENGINE WITH ROTATING COMBUSTION CHAMBER
Filed Feb. 12, 1965     5 Sheets-Sheet 3
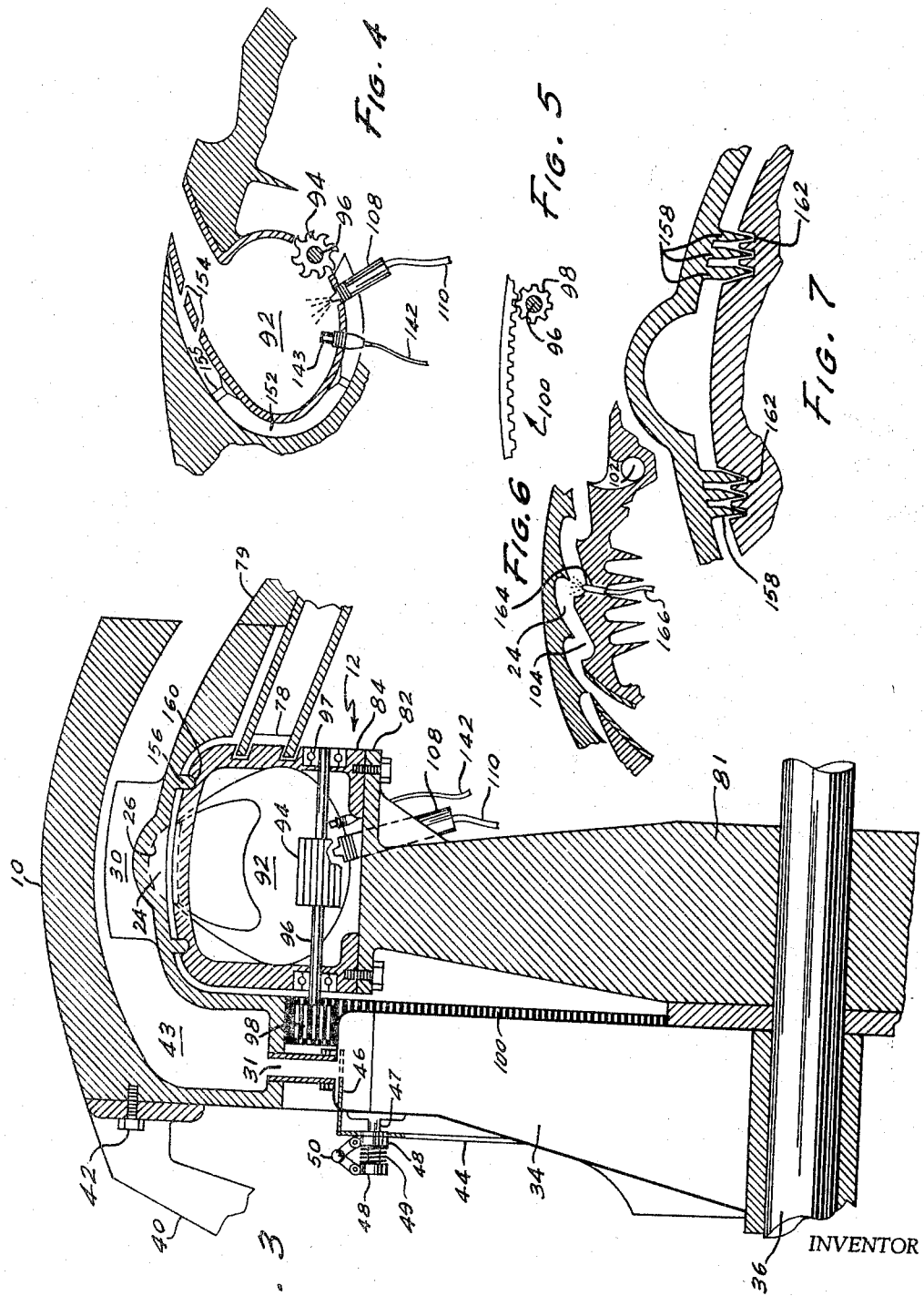
INVENTOR
Tommie Lynn Myles
BY
Adolph C. Hugin
ATTORNEY

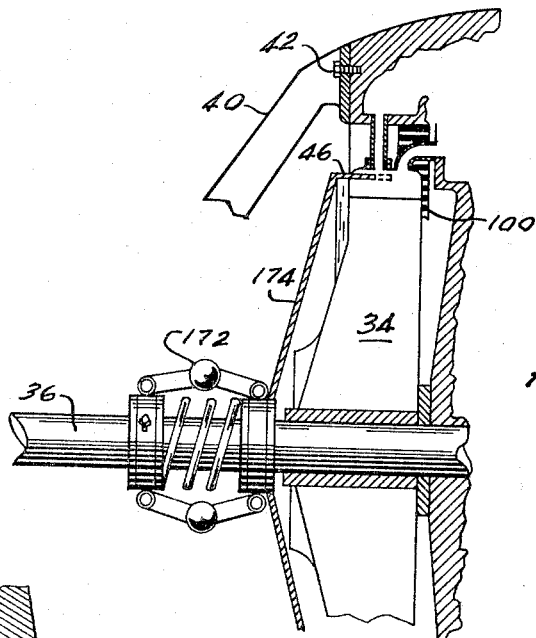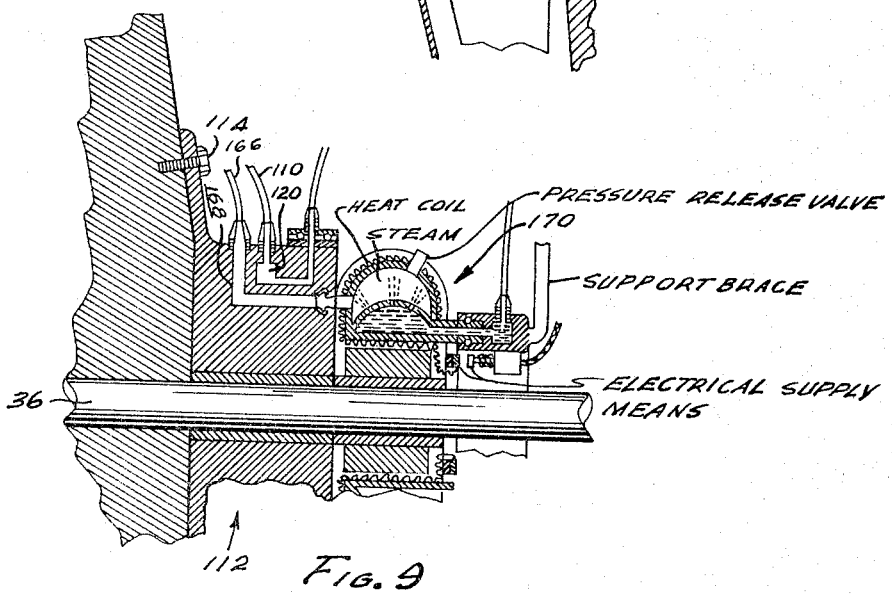

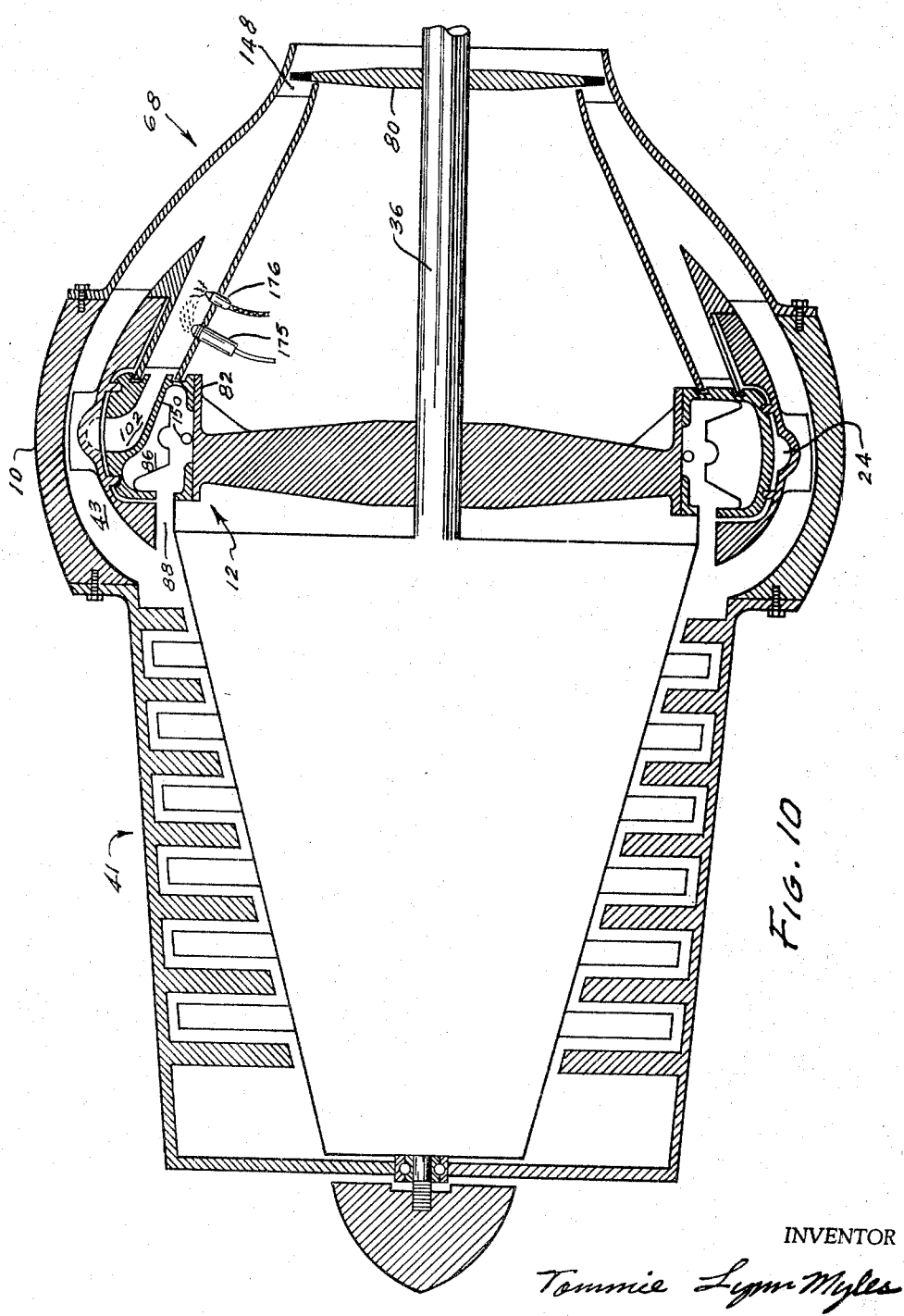

United States Patent Office 3,321,911
Patented May 30, 1967

3,321,911
GAS TURBINE ENGINE WITH ROTATING COMBUSTION CHAMBER
Tommie Lynn Myles, 129 Webster St. NW., Washington, D.C. 20011
Filed Feb. 12, 1965, Ser. No. 432,274
15 Claims. (Cl. 60—39.35)

This invention relates to a turbine type of gas engine and more specifically to a continuous combustion type of engine having a stator and a rotor, wherein a liquid or vaporized fuel and air are forced into mixing and combustion chambers in the rotor of the engine, the resultant mixture is ignited, the expanding gas exerts its force against walls of pockets in the rotor and stator, and the spent gases are exhausted through ports in the rotor.

It is an object of this invention to provide an engine of this type wherein the rotor is positively displaced similar to the manner in which a piston in a cylinder is displaced by expanding gases and in which the positive displacement of the rotor takes place under conditions of continuous combustion without the use of valves, pistons, cams, or other similar sequential timing devices.

It is further object of this invention to provide an engine capable of producing useful jet thrust.

Yet another object of the invention is the incorporation within a turbine engine the most desirable characteristics of both a turbine engine and an internal combustion reciprocating engine.

The best characteristic of a reciprocating engine is taken to be the almost instant torque capability and the resultant rapid acceleration that is made possible by the manner in which the piston is displaced in the cylinder. The object then is to duplicate as nearly as possible a similar combustion environment within a turbine engine.

The best characteristics of the turbine engine are taken to be the small number of moving parts, the relatively few friction bearing surfaces, and the smooth vibrationless running that is generally characteristic of such engines.

It is a further object of the invention to provide a turbine engine of this type no matter whether it be an internal combustion turbine engine, an internal combustion jet turbine, or a steam turbine.

It is also an object of the invention to provide an engine that combines the functions of an internal combustion turbine with those of a steam turbine.

And yet another object is to provide engines of the above description which are relatively inexpensive to manufacture, of light weight, and easy to assemble and disassemble.

Still another object of the invention is to provide efficient cooling means for the engine, as well as to provide a structure which will efficiently use the fuel supplied thereto.

Still further, it is an object of the invention to provide accessory devices to insure proper starting of the engine and proper feed of fuel to the engine, as well as supplying proper ignition means for the gases in the engine.

Other objects will become apparent upon consideration of the following specification when read in conjunction with the accompanying drawings in which:

FIG. 3 is a section along the line 3—3 of FIG. 1 with parts shown in elevation;

FIG. 4 is a fragmentary view showing a modified form of combustion chamber utilized in the engine;

FIG. 5 is a fragmentary view showing in greater detail than in other views a gearing utilized for driving an air supply pressure booster for the engine;

FIG. 6 is a fragmentary view showing a portion of the engine wherein steam is introduced into the turbine section of the engine;

FIG. 7 shows, in fragmented section, a modified form of seal for the relatively rotative parts of the engine;

FIG. 8 is a fragmentary view of an air flow control mechanism;

FIG. 9 is a fragmentary view of a modified form of engine showing a fluid flow coupling mechanism and steam producing device; and FIG. 10 is a sectional view showing a modified form of air compressor used in conjunction with the engine, parts of the engine structure being omitted for the sake of clarity.

Figure 1:
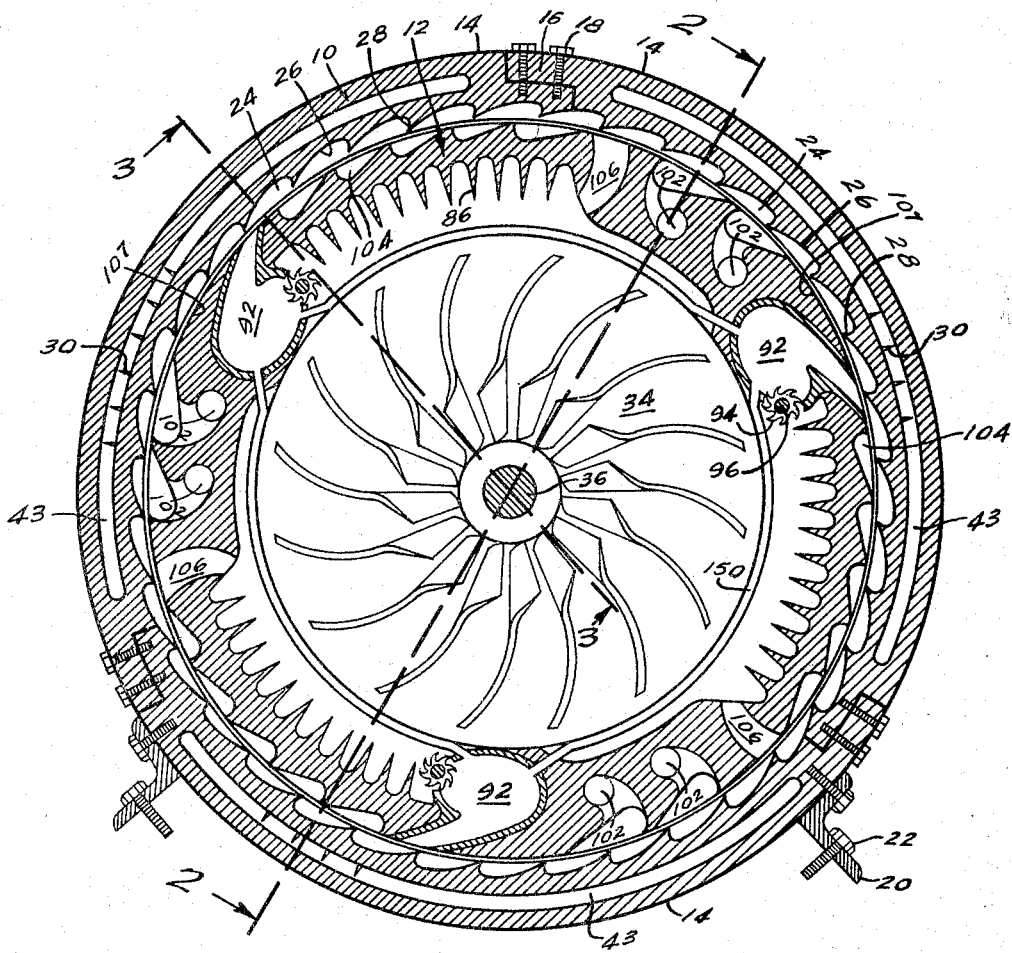
FIG. 1 is an end view of the engine with parts shown in section.

Now referring to the drawings in greater detail, the turbine engine comprises a stator indicated generically at 10 and rotor indicated generically at 12.

The stator, in the main, see FIG. 1, is comprised of a multiplicity of arcuate sections 14 bolted together at overlapped portions 16 by bolts 18 to form a ring structure. The stator may be mounted on a support in any suitable manner, as by means of lugs 20 and bolts 22 passing through the lugs. The interior surface of the stator ring is provided with a series of pockets or buckets 24, each with a sloping bottom 26 and an inclined wall 28 merging into the bottom 26 and forming therewith a smoothly curved joining surface.

The stator ring sections are hollow, forming inner and outer faces to allow for the circulation of air between these faces of the stator as will be described, and each of the hollow spaces is provided with equally spaced cross vanes, indicated at 30 in FIGS. 1 and 2. Only a few vanes are shown in each hollow section in the interest of clarity.

An air inlet 31 to the inner face of the ring is formed by two annular plates 32 fastened to the stator, the air inlet passing through the wall of the stator and leading to the space within which the vanes 30 are located. An air impeller 34, fixed on a rotor shaft 36, centrifugal blows air into the space between the annular plates 32 in order appropriately to cool the engine. The rotor shaft is mounted in bearings 38 in a spider 40 at one end of the engine and in a suitable bearing (not shown) rising from the base at the other end of the engine. As an alternative, a compressor of conventional type, shown at 41 in FIG. 10, may be employed. The spider 40 is bolted, as at 42, to the stator. In order, at high speeds, to increase the influx of air into the opening 31 and to increase the flow through the by-pass duct 43, see FIG. 3, a ring like damper 44 with skirt portion 46 can be retracted from across the opening 31, the skirt portion moving parallel to the rotor shaft. Any desired form of speed controlled device may be utilized to shift the damper, such as a centrifugal governor 50 supported by the compressor casing. This support may comprise any suitable mounting, and, in the FIG. 3 embodiment, includes a stub shaft 47 rigidly secured to the compressor casing. The illustrated governor is secured to the shaft 47 by a ring 48 fixedly mounted on the outer end of the shaft with an inner ring 48′ slidably mounted on the shaft. The governor rings 48 and 48′ serve as spring seats for a governor spring 49. As many of these governor devices as desired may be placed around the circumference of the damper to secure proper action of the damper.

Figure 2:
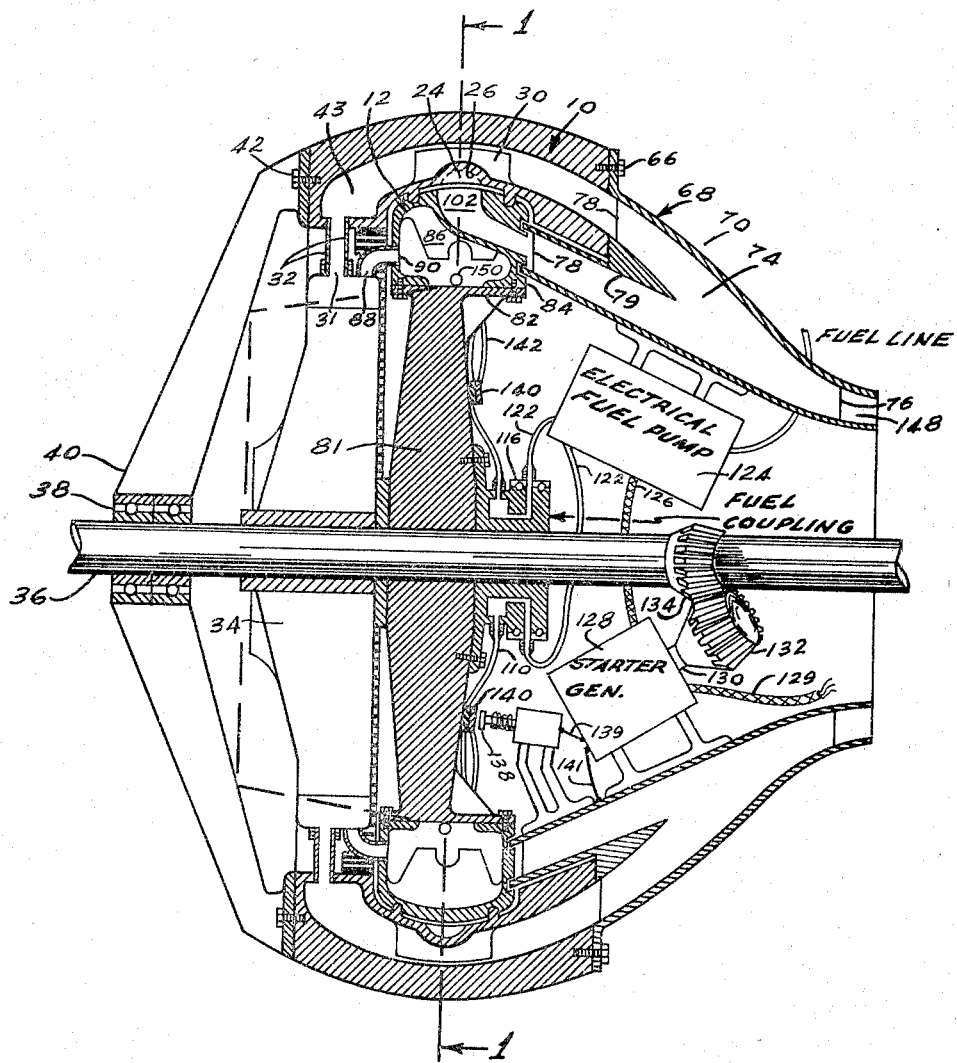
FIG. 2 is a side view of the engine with parts shown in section along the line 2—2 of FIG. 1, parts being omitted for clarity.

The stator also has fastened to it, see FIG. 2, as by bolts 66, an exhaust duct 68, somewhat in the form of a truncated cone, whose outer wall 70 may be additionally supported at its free end in any convenient fashion. The inner wall 72 of the duct is supported from the outer wall by a desired number of partition walls 74, the outer edge of which is indicated at 76 and the inner edge of which, indicated at 78, is stepped and recessed to accommodate and fixedly position a separator ring 79. This ring guides the cooling air from the stator and the exhaust spent gases from between the rotor and the stator into the truncated cone and on to the outer atmosphere. The air, in passing by exit openings of the spent combusted gases, exerts an aspirating effect on these gases, promoting proper passage of the combusting gases through the engine. If desired, and as indicated in FIG. 10, the rotor shaft 36 may have secured to it, within the truncated cone, a conventional turbine 80, to be driven by the nearly spent gases, to further increase the efficiency of the engine.

The rotor 12, see FIG. 3, is secured to the rotor shaft 36 and may be a solid disc 81 or a spoked wheel with a central solid hub fastened to the shaft. The periphery of the wheel or disc is provided with a flange 82 to which is bolted the inner race 84 of the rotor. The inner race is provided with vanes 86, see FIGS. 1 and 2, for cooling the rotor and preheating air from the impeller 34 entering the hollow of the race via spaced ducts 88 carried by the compressor and rotor and spaced apertures or slots 90 in the side of the race of the rotor. This air, which cools the vanes 86, is pumped into combustion chambers 92, of which there are a number equally spaced about the rotor, these chambers venting into the space between the rotor race and stator ring. To effect the pumping of the air into the chambers, each chamber is provided with a vaned pump 94 fixed on a shaft 96 rotatably mounted in bearings 97 on the rotor, the end of the shaft adjacent to the impeller having secured thereto a pinion 98 meshing with an internal ring gear 100 fastened to the stator, see FIGS. 1, 3, and 5. The chambers are also force fed with fuel by any suitable injection system, and provided with ignition devices, as will be explained. The ignited fuel heats and expands and travels in the spaces between the stator ring and rotor race to ultimately reach exhaust openings 102 in the rotor. Between the ignition chamber and the exhaust openings, the outer face of the rotor is formed with pockets or buckets 104 symmetrical with and in opposed relation to the stator pockets 24. As the ignited gas expands into the stator buckets and is deflected back upon the rotor buckets, the rotor is displaced in a counterclockwise direction as viewed in FIG. 1. In between each of the ignition chambers and exhaust openings, there is an exhaust by-pass or passage 106 so that some of the gaseous products which may not have been entirely consumed, can be returned to the ignition chamber, along with the air being fed thereto, this arrangement forming a regenerative means. Also, immediately adjacent to the leading edge of each expansion chamber of the rotor there is provided an elongated circumferential area 107 on the rotor which substantially seals off at least one of the stator buckets opposite these leading edge seals, and a continuous expansion passage is provided, in a clockwise direction as viewed in FIGS. 1 and 6, from each combustion chamber to its respective exhaust opening or openings through the stator and rotor buckets.

Fuel is fed to the ignition chambers via nozzles 108, one or more being fixed to the rotor for each chamber, and a fuel feed line 110, FIGS. 2, 3, and 9, from each nozzle connects with a cylindrical fuel distributor box 112 fixed to the rotor, as by bolts 114. The box rotates within a fixed ring 116, said ring being suitably supported, as from the exhaust duct 68, and having a port 118 communicating with an annular passageway 120 in the box. Rigid pipes 122 connect the box 112 with a fuel pump 124, which pump receives fuel from any convenient tank, and pumps the same into the box. Each ignition chamber may be supplied with fuel from a separate annular passageway as in 120 and 168 and the flow of fuel to these passageways may be controlled from the electric fuel pump so that particular ignition chambers may be selected to be ignited as desired. The pump may be driven in any convenient fashion, as by an electric motor receiving its current via cable 126 from a battery within a battery case 128, which also contains an electric motor starter fed from the battery. The wiring from the fuel pump motor and the starter motor can be led to the exterior of the engine as via a multiple wire cable 129 and provided with switches to individually control the motor. The starter motor has a shaft 130 to which is fastened a gear 132 meshing with a gear 134 on the rotor shaft 36. The shaft 130 also drives the generator within the case 128 for charging the battery during the running of the engine. Conventional battery charge controls, not shown, are provided. The case 128 and generator are supported in any convenient fashion from the stator structure. A brush 138 in electrical connection with one pole of the battery by wire 139 is spring urged against a conductor ring 140 insulatively mounted on the rotor and concentric with the axis thereof. The other pole of the battery is grounded, as via wire 141. Current from the ring is fed via insulated conductors 142 to the hot wire or other igniting plug or plugs 143 in each of the chambers. The starter equipment, while not necessary, is added to insure quick acceleration of the engine, should it be desired.

Hot gases from the rotor are exhausted into the spaces between the partition walls 74 and out through an annular exhaust chamber 148.

In order to promote the equalization of combustion in each of the chambers, piping 150 is provided interconnecting the various chambers, and each chamber, in addition, may be jacketed to provide an air space, as indicated at 152 in FIG. 4, so that some air may be driven by the vaned pump 94 into this space, the air venting by ports 154 into the combustion chamber. Brace structures 155 may be interposed between the inner and outer walls of the chamber to properly support the parts of the combustion chamber. It is understood that in some cases it may be desirable to remove the vaned pump to facilitate the air flow into the ignition chamber, in which case the ignition chambers would function as conventional burner cans.

In order to prevent loss of power, a labyrinth type of seal is provided between the stator and the rotor. For example, the stator provided with a pair of circular flanges, as indicated in 156 in FIG. 3 or with a pair of sets of flanges as indicated at 158 in FIG. 7 coacting with interjacent circular grooves 160 (FIG. 3) or 162 (FIG. 7) in the rotor to seal the space between the rotor and the stator within which the combustion gases flow.

A modification of the invention as hitherto described, it may be found desirable to add more moisture to the combusting gases. As shown in FIG. 6 when taken in conjunction with FIG. 9, such moisture may be provided in the form of steam, steam being admitted into the combustion space by means of a nozzle 164, the steam being fed thereto by means of a pipe 166 leading to a second annular passageway 168 in block 112, steam being fed to said passageway 168 from a suitable steam generating device 170.

As a modification of the means for shifting the damper 44, and as disclosed in FIG. 8, a single centrifugal governor 172 is employed mounted on and driven directly from the shaft 36 and operating on spoked portions 174 of the damper. Furthermore, as shown in FIG. 10, should it be so desired, after burner means in the form of a fuel nozzle 175 and igniter means 176 may be inserted into the exhaust from the expansion chambers to provide additional thrust when needed.

While particular embodiments of the present invention have been illustrated and described, modifications thereof will occur to those skilled in the art. It is to be understood, therefore, that this invention is not to be limited to the particular arrangements and structures disclosed, and it is intended in the appended claims to cover all modifications within the spirit and scope of this invention.

Having described the invention, what is claimed as new is:

1. An internal combustion turbine engine comprising an air compressor, a rotor and a stator, a combustion chamber on said rotor, means for supplying fuel to said combustion chamber, fuel igniting means in said chamber, means for feeding air to said chamber, a plurality of combustion gas directing buckets on said stator, said rotor being comprised of the combination arranged successively in the following order or said combustion chamber, a plurality of impulse-reaction buckets that communicate with said combustion chamber via cooperative stator buckets, exhaust ducts in said rotor for the products of combustion arranged to communicate with successive stator buckets as said rotor rotates, and a preheat chamber for simultaneously cooling the engine while preheating incoming air enroute to the combustion chamber.

2. The structure of claim 1 wherein said rotor is further comprised of a regenerative means for routing a portion of the hot exhaust gases directly into said preheat chamber.

3. The structure of claim 2 wherein said rotor is further comprised of an interconnecting duct between a plurality of combustion chambers said duct serving to facilitate and maintain combustion in all chambers simultaneously.

4. The structure as set forth in claim 3 wherein there is a multiplicity of combustible chambers and means are provided for introducing a combustion mixture simultaneously into all said chambers and for simultaneously exhausting all of said chambers.

5. A jet turbine engine comprising a rotor having a combustion chamber, a stator having buckets, and an air compressor, said engine being further provided with the means for introducing into said combustion chamber a combustible mixture, means on said engine for igniting such mixture, the rotor of said jet engine being further provided with the combination of a plurality of impulse-reaction buckets that communicate with said combustion chamber via acting cooperatively with said stator buckets and exhaust ducts in said rotor for channeling the products of combustion to produce a jet thrust.

6. The jet turbine engine of claim 5 wherein the rotor is further comprised of a preheat chamber provided with heat dissipating fins.

7. The engine of claim 6 wherein the rotor is further comprised of regenerative means for routing a portion of the hot exhaust gases directly into a preheat chamber.

8. The structure of claim 7 wherein the rotor is further comprised of an interconnecting passageway between a plurality of combustion chambers, said passageway serving to facilitate and maintain combustion in all chambers simultaneously.

9. A combustion gas turbine engine comprising a stator and a rotor, cooperating sets of turbine buckets on the stator and the rotor, spaced combustion chambers movable with the rotor venting into the buckets, a sealing portion on said rotor on the leading side of each combustion chamber, and exhaust openings in the rotor on the leading side of said sealing portion, said stator and rotor buckets being formed with oppositely extending shallow portions, means feeding fuel and air to said combustion chambers, and means in the chambers for igniting the resultant mixture forming combustion gases.

10. The structure of claim 9 including air passages in said rotor leading to the combustion chambers and heat transfer vanes extending into said passages.

11. The structure of claim 9 including a means in the rotor for returning some of the combustion gases between the buckets of the rotor and stator to the combustion chambers.

12. The structure of claim 9 including means providing a direct intercommunication between adjacent combustion chambers to equalize combustion in the chambers.

13. A combustion gas turbine engine comprising a stator and rotor, cooperating turbine buckets on the stator and the rotor, spaced combustion chambers in the rotor having air inlets and venting into the buckets, an exhaust passage means on said rotor and initially directing exhaust gases radially, inwardly of said rotor for scavenging gases from said buckets, means for feeding air to said combustion chambers comprising a ring gear attached to said stator and, for each chamber, a pinion meshing with said gear, a shaft mounted in bearings in each of said chambers on which the pinion is fixed, and a vaned pump fixed to said shaft at the air inlet to said chamber, means for feeding a fuel to said chambers, and means for igniting the resultant mixture within the chambers.

14. The structure of claim 13 including cooling chambers about the rotor, said air feeding means having at least a part driven by the rotor and communicating with said cooling chambers about the rotor and with each of said combustion chambers.

15. A combustion gas turbine engine comprising a stator and a rotor with opposing turbine buckets on the stator and rotor, combustion chambers in the rotor and means for feeding said chambers with air, and an igniter in each chamber, a fuel supply means carried by a stationary part of the engine, a fuel distributor box mounted concentrically with the axis of the rotor, distributing lines from the distributor box to each of the combustion chambers, a sealing portion on said rotor adjacent to each combustion chamber on the direction of rotation side thereof for sealing off communications with stator buckets on the leading side of said chamber, and exhaust passages in said rotor on the leading side of each of said sealing portions and in communication with stator buckets and initially directing exhaust gases radially inwardly of said rotor.

References Cited

UNITED STATES PATENTS

| | | | |
|---|---|---|---|
| 2,404,334 | 7/1946 | Whittle | 60—39.37 X |
| 2,407,824 | 9/1946 | Fisher | 60—39.35 |
| 2,594,629 | 4/1952 | Exner | 60—39.35 X |
| 2,703,477 | 3/1955 | Anxionnaz | 60—262 |
| 2,793,496 | 5/1957 | Mortimer. | |
| 3,092,967 | 6/1963 | Preston | 60—39.35 |

FOREIGN PATENTS 615,546  6/1961  Italy.

MARK NEWMAN, *Primary Examiner.*
RALPH D. BLAKESLEE, *Examiner.*